United States Patent [19]

Roger

[11] 4,110,671
[45] Aug. 29, 1978

[54] SPEED VARIATOR FOR A UNIVERSAL ELECTRIC MOTOR

[75] Inventor: Jean Roger, Conflans Ste Honorine, France

[73] Assignee: Aciers et Outillage Peugeot, Audincourt, France

[21] Appl. No.: 797,958

[22] Filed: May 18, 1977

[30] Foreign Application Priority Data

May 18, 1976 [FR] France ............... 76 14942

[51] Int. Cl.² .................................. H02P 5/40
[52] U.S. Cl. ............................. 318/227; 318/230; 318/245
[58] Field of Search .......... 318/227, 230, 245, 345 R, 318/345 C, 345 D

[56] References Cited

U.S. PATENT DOCUMENTS

| | | | |
|---|---|---|---|
| 3,271,648 | 9/1966 | Weed | 318/227 UX |
| 3,366,861 | 1/1968 | Dudler | 318/227 |
| 3,443,188 | 5/1969 | Mortimer | 318/227 UX |
| 3,447,057 | 5/1969 | Brown et al. | 318/227 UX |
| 3,470,436 | 9/1969 | Steele | 318/227 |
| 3,596,158 | 7/1971 | Watrous | 318/227 |
| 3,875,485 | 4/1975 | Hornung | 318/227 |

Primary Examiner—Gene Z. Rubinson
Attorney, Agent, or Firm—Sughrue, Rothwell, Mion, Zinn and Macpeak

[57] ABSTRACT

The variator comprises a triggerable silicon-controlled rectifier component for connection in series with the a.c. motor to the a.c. source, and a phase-shifting circuit connected to the terminals of the rectifier component and comprising a capacitive branch and a resistive branch which has a regulating potentiometer. The junction between these two branches is connected to the control electrode of the rectifier component. A unidirectional semiconductor component responsive to voltage is connected in parallel with the capacitive branch and a part of the resistive branch in which the potentiometer is inserted. The resistive branch comprises connected in parallel a first branch comprising a first resistor and the potentiometer and a second branch comprising a second resistor and a third resistor. The junction between the second and third resistors is connected to the slide of the potentiometer and the unidirectional component is connected to the junction between the potentiometer and the first resistor.

8 Claims, 4 Drawing Figures

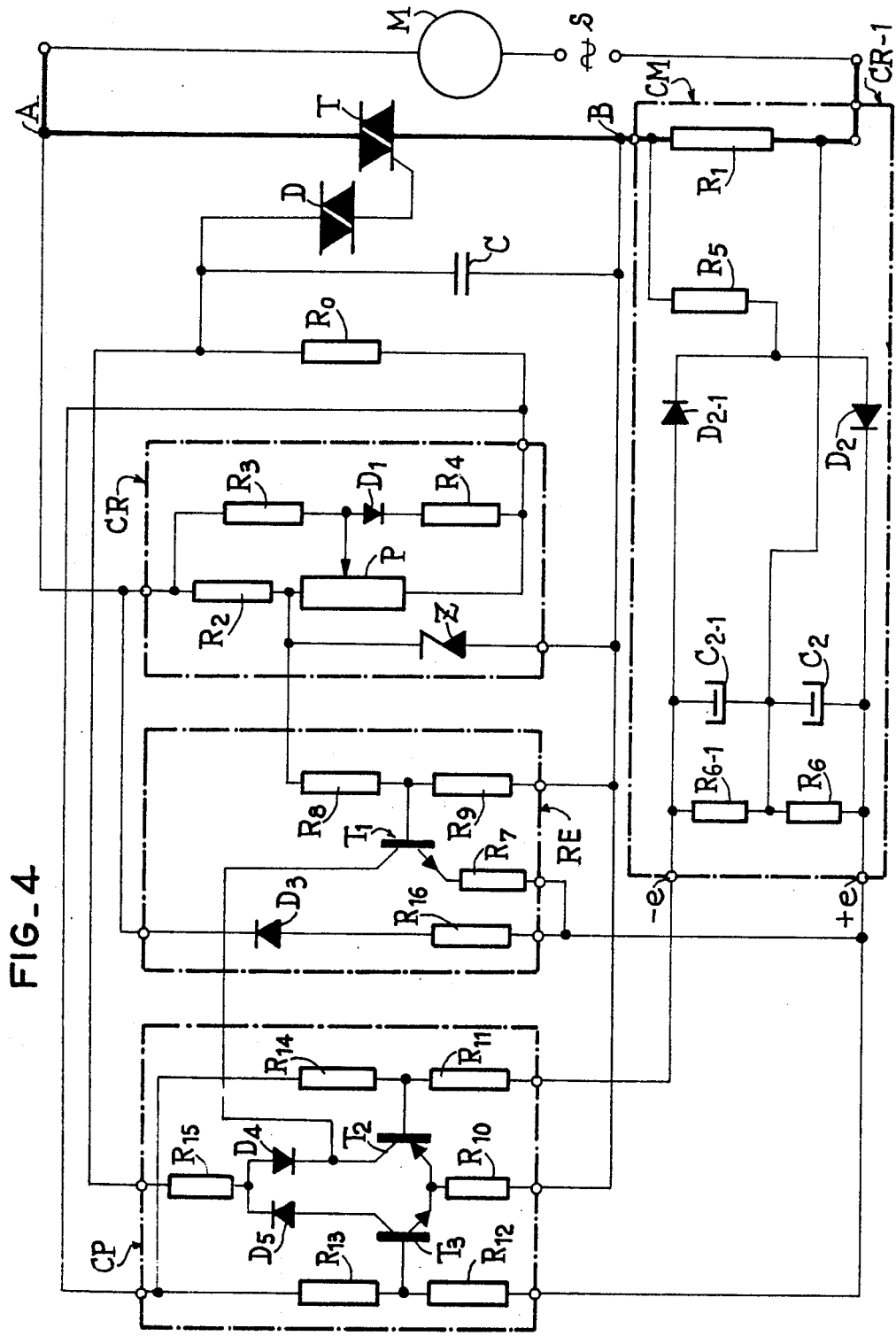
FIG_4

SPEED VARIATOR FOR A UNIVERSAL ELECTRIC MOTOR

The present invention relates to universal electric motors of the single-phase alternating current type and relates more particularly to a speed variator for these motors.

In known speed variators of this type there is employed a triggered semiconductor, such as a thyristor, or more recently, a triac, which, by a modification of the phase of the control voltage allows through a more or less large part of one of the alternations or of both alternations of the alternating current.

In the particular case of triac speed variators, it has been found that at low speeds the regulation is more difficult owing to the greater reduction of the angles of passage of the current in each phase, the effective power is also weaker for the same initial unloaded speed of the motor, and the variations of the voltage of the supply source greatly affect the set or desired speed.

In providing a negative feedback circuit in the phase shifting circuit of the control voltage of the triac this defect can be substantially reduced by partly controlling the angle of the opening of the triac by the remanent e.m.f. of the motor (see in particular French Pat. No. 1,591,033 in the name of the Applicant).

However, this negative feedback circuit acts only on a single alternation and the dispersions or variations of the remanent e.m.f. from one motor to another are far from negligible and have an effect on the regulation of the negative feedback circuit.

An object of the invention is to remedy the drawbacks of the circuits of the prior art by ensuring an effective regulation both in the high speed range and in the low speed range.

According to the invention, there is provided a speed variator for a single-phase a.c. motor comprising a triggerable Silicon controlled rectifier component adapted to be connected in series with said motor to an a.c. current source, and a phase shifting circuit connected to the terminals of said rectifier component and comprising a capacitive branch and a resistive branch having a regulating potentiometer, the junction between said two branches being connected to the control electrode of said rectifier component, wherein a voltage responsive unidirectional semiconductor component is connected in parallel with said capacitive branch and a part of said resistive branch in which said potentiometer is inserted.

Owing to these features, the motor can operate in respect of a single half-cycle of the supply voltage when it operates at low speed and in respect of both half-cycles when it operates in the high speed range, the transition between the two modes of operation being fully automatic and unnoticed by the user, whereas in each of the modes of operation the displacement of the slide of the potentiometer results in the regulation of the speed of the motor.

Further features and advantages of the invention will be apparent from the ensuing description.

In the accompanying drawings, given solely by way of example:

FIG. 4 is a diagram of another embodiment of the invention in which the variator is provided with a circuit protecting it from overloads.

Figure 1:
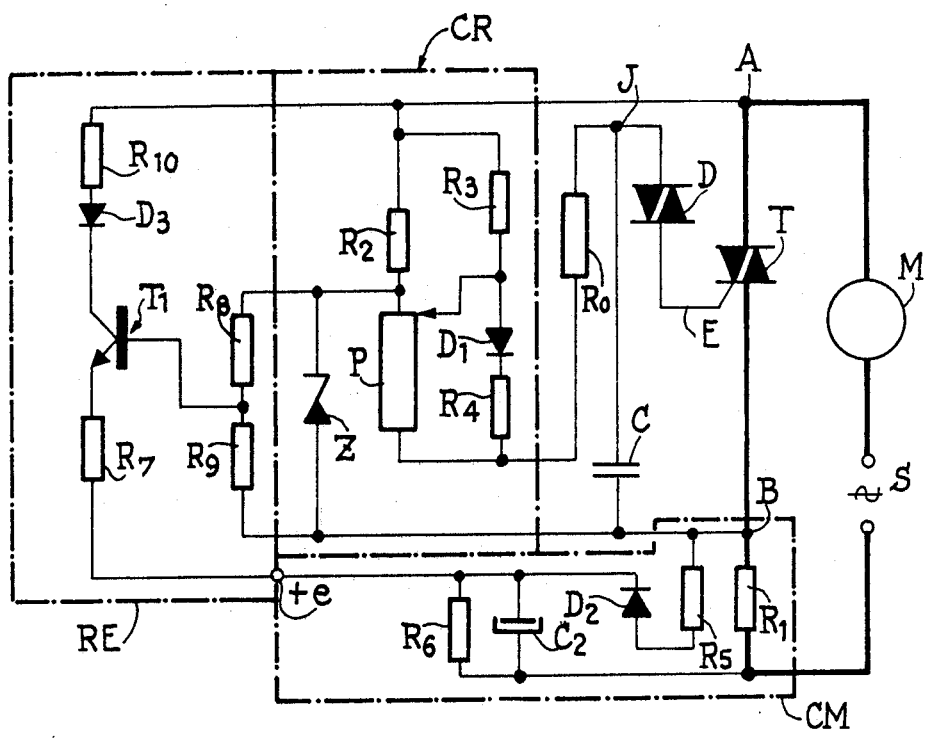
FIG. 1 is a diagram of a first embodiment of the speed variator according to the invention.

FIG. 1 shows a universal motor M, namely a single-phase a. c. motor which is connected in a series circuit supplied with current by an a.c. supply S, such as the mains. The series circuit comprises, in the known manner, a triggerable semiconductor component such as a triac T and, according to the invention, a series resistor $R_1$ of low value and supplying a measuring voltage which is proportional to the current flowing in the motor M.

The control electrode E of the triac T is connected to a diac D or like component which is connected to the intermediate junction J of a phase shifting circuit comprising a capacitor C, a resistor $R_o$ and a regulating circuit CR, this regulating circuit being connected between a point $+A$ which constitutes one of the terminals of the motor M, and the point B which is formed by the terminal of the triac T opposed to that which is connected to the motor M.

The regulating circuit CR comprises two series circuits connected in parallel, one being formed by a resistor $R_2$ and a potentiometer P, and the other by a resistor $R_3$, a diode $D_1$ and another resistor $R_4$. This parallel connection is connected between the point A and the resistor $R_o$.

A unidirectional component responsive to voltage, such as a Zener diode Z, has its anode connected to the point B whereas its cathode is connected to the junction between the resistor $R_2$ and the potentiometer P.

The resistor $R_1$ is part of a current measuring circuit CM which comprises a series resistor $R_5$ connected to the point B, a rectifying diode $D_2$ connected to the resistor $R_5$, a capacitor $C_2$ connected to the diode $D_2$ and the terminal of the resistor $R_1$ opposed to the point B, and a resistor $R_6$ which is connected in parallel with the capacitor $C_2$.

A feedback circuit RE is connected between the points A and B and provides a parallel path which is adjustable as a function of the current flowing in the motor M, the current flowing through the phase shifting circuit CR, $R_o$ and C. This circuit RE comprises a regulating transistor $T_1$ connected in a common base circuit. The emitter of this transistor $T_1$ is connected to the output of the measuring circuit CM through a resistor $R_1$, its base is connected to a junction point between two resistors $R_8$ and $R_9$ which are connected in parallel with the Zener diode Z and its collector is connected through a diode $D_3$ and a resistor $R_{10}$ to the point A.

Figure 2:
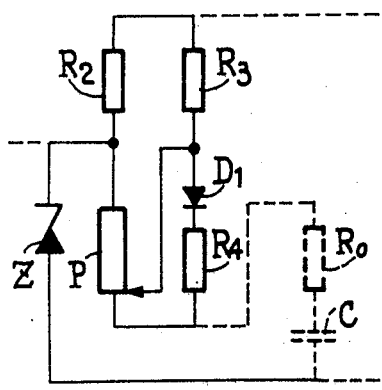
FIG. 2 is a partial diagram of this variator illustrating operation at full speed.
Figure 3:
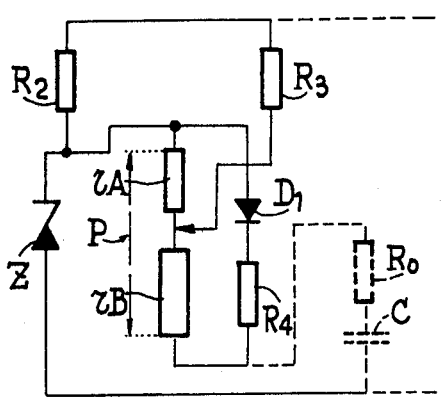
FIG. 3 is a similar diagram illustrating operation at an intermediate speed.

The operation is as follows (FIGS. 2 and 3):

The capacitor C is periodically charged through the circuit CR and the resistor $R_o$ and thus accumulates for each half-cycle the energy necessary for triggering the diac D and the triac T. However, in order that this energy be capable of reaching the triac T (control electrode E) it must be sufficient to trigger the diac D. The energy is accumulated within a period of time which is short relative to the period of the voltage of the supply source and in general less than a millisecond, provided that the circuit CR only introduces a low impedance between the resistor $R_o$ and the point A.

The circuit CR has between these two points a variable impedance which is a non-linear function of the position of the slide of the potentiometer P. Thus, by accelerating or retarding the charging of the capacitor C, it is possible to obtain a variable triggering instant in each half-cycle of the triac T.

Consequently, when the slide of the potentiometer P is in the low position (that is, connected to the resistors $R_4$ and $R_o$, FIG. 2) the low value resistor $R_3$ allows a high current to reach the resistor $R_o$. The capacitor C is then charged rapidly and this during the two half-cycles of the supply voltage. The triac T is therefore open at the start of each half-cycle and everything occurs as if the motor M were supplied with a full wave supply (maximum speed).

When the slide is in the upper position, that is, connected to the resistor $R_2$ and the Zener diode Z (case shown in FIG. 1), the operation is different in the course of the positive and negative half-cycles.

During the positive half-cycle (the potential of the point A is higher than that of the point B), the current coming from the point A through the resistors $R_2$ and $R_3$ rapidly polarizes the Zener diode Z at its conduction threshold of for example 100 volts. Henceforth, the capacitor C continues to be charged practically at a constant current through the potentiometer P and the resistor $R_4$, the latter being adapted to determine the value of the desired charging current for the minimum speed of the motor M.

However, under these conditions, the negative half-cycle (B>A) cannot have an effect on the charging of the capacitor C, since as the Zener diode acts as a passing diode, no negative current can appear in the resistor $R_o$, the latter and the capacitor C being as it were short circuited.

The motor M is then supplied with a half-wave voltage since during the negative half-cycles the triac T is not open. Consequently, there are obtained the advantages of a half-wave operation usually achieved by a thyristor, namely an easier regulation and an increased torque on the shaft of the motor.

Thus it is possible, in starting with the minimum speed of the motor M, to increase the speed of the latter by shifting the slide of the potentiometer P downwardly. However, under these conditions, the potential of the slide of the potentiometer P becomes negative since a certain resistance rA, which is that of the upper fraction of the winding of the potentiometer P, separates its slide from the zero potential imposed by the Zener diode Z at its point of junction with the resistor $R_2$. Therefore, a negative current flows in the resistor $R_o$ through the lower part rB of the potentiometer P and charges the capacitor C. However, during a certain travel of the slide, the energy accumulated in the capacitor C is insufficient to trigger the diac D during the half-cycle during which the potential of the point B is higher than that of the point A and, during this travel, the operation therefore remains of the single half-cycle type. The regulation of the current can therefore be achieved throughout this part rA of the potentiometer during all the half-cycles during which the potential of the point A is higher than that of the point B. However, if the slide reaches a certain position (which may be located at one third of its travel from its upper terminal), there is a transition since a moment arrives at which, even in each negative half-cycle, the capacitor accumulates sufficient energy to trigger the diac D and consequently the triac T.

For the remainder of the travel of the slide the operation is therefore increasingly a double half-cycle operation, that is, a balanced operation.

Owing to the circuit according to the invention, there is therefore obtained an operation of the variator which for the low speed range ensures an operation of single half-cycle type of the motor and, for the high speed range, a double half-cycle operation, the transition being fully automatic and the regulation being achieved with a single element having a variable position, that is the slide of the potentiometer P.

When the motor M operates with a current whose intensity corresponds to a nonloaded operation and with a setting of the potentiometer P (corresponding to low speed and single half-cycle operation), the transistor $T_1$, which is connected in a common base configuration shunts a large current relative to that flowing through the potentiometer P and the resistor $R_4$ to charge the capacitor C. The charging current is therefore low and the capacitor is charged slowly, so that the angle of the opening of the triac T is small and the motor M consequently operates slowly.

When the load on the motor M increases, the latter will have a tendency to slow down; as its current increases, the measuring circuit CM furnishes an increasing voltage at its output. As this increasing voltage tends to reduce the conduction of the transistor $T_1$ (during the positive half-cycle), the capacitor will be charged more rapidly and the angle of opening of the triac T will be larger and there is a compensation for the drop in speed that the motor would have had in the absence of the negative feedback circuit RE. Note that the negative feedback phenomenon described hereinbefore is easy to control owing to the provision of the Zener diode Z which here intervenes to render both the charging of the capacitor C and the shunting of the current through the transistor $T_1$ linear. There is consequently a suppression of the hunting of this regulation which is therefore achieved by the Zener diode.

When the no-load speed of the motor M is increased by shifting the slide of the potentiometer P, the negative feedback effect of the circuit RE progressively diminishes since the current shunted by this circuit remains roughly constant whereas the current flowing in the branch constituted by the potentiometer P and the resistor $R_4$ substantially increases. Moreover, the transistor $T_1$ does not act on the negative half-cycle so that at the maximum-speed position of the slide of the potentiometer P, the influence of the negative feedback is negligible.

FIG. 4 illustrates another embodiment of the invention having a speed variator which comprises all the elements of the variator shown in FIG. 1 but also a circuit CP which protects against overloads and constitutes a second shunt circuit of the charging current of the capacitor C. To operate, the protection circuit CP requires, apart from the $+ve$ voltage which is the image of the current of the motor in the positive half-cycles, a $-ve$ voltage representing the current of the motor during the negative half-cycles. For this purpose, the measuring circuit CM comprises a second diode $D_{2-1}$ which is anti-parallel relative to the diode $D_2$, a capacitor $C_{2-1}$ and a resistor $R_{6-1}$, these components furnishing, from the voltage received at the terminals of the resistor $R_1$, the desired $-ve$ voltage in the same way as the components $D_2$, $C_2$ and $R_6$ furnish the $+ve$ voltage.

The protection circuit CP comprises two transistors $T_2$ and $T_3$ of opposed conductivity types connected in a common emitter configuration.

The emitter of these transistors are together connected to a resistor $R_{10}$ which is connected to the junction point B of the triac T and the resistor $R_1$. The resistor $R_{10}$ has a double function, namely it permits a compensation for possible deviations of the parameters of the transistors $T_2$ and $T_3$ and it permits limiting the gain of the latter so as to damp their switching action and thereby avoid an excessively abrupt operation of the device. The base of the transistor $T_2$ is connected through a resistor $R_{11}$ to the $-ve$ terminal of the measuring circuit CM and the base of the transistor $T_3$ is connected to the $+ve$ terminal of this circuit CM through a resistor $R_{12}$. These bases are also connected, through resistors $R_{13}$ and $R_{14}$ respectively, to the junction point of the resistors $R_0$ and $R_4$.

The collectors of the transistors are connected respectively through protection diodes $D_4$ and $D_5$ connected in opposed relation to a common collector resistor $R_{15}$ which is connected to the junction point of the capacitor C and the resistor $R_o$.

The diode $D_3$, instead of being directly connected to the collector of the transistor $T_1$, is in this case connected in series with a resistor $R_{16}$ and thereby permits with this resistor a regulation of the $+ve$ voltage coming from the measuring circuit CM.

The protection circuit CP operates in the following manner:

While the current in the motor has a value lower than the threshold value considered as the limit value not to be exceeded, the value of the $+ve$ and $-ve$ voltages furnished by the measuring circuit CM are too low to cause the conduction of the transistor $T_2$ and $T_3$. Under these conditions, the maximum voltage across the capacitor C is solely determined by the other shunt circuit described hereinbefore. However, when the intensity of the current in the motor and the resistor $R_1$ reaches a sufficient value, the diodes $D_2$ and $D_{2-1}$ each start to conduct the respective half-cycle of the voltage produced at the terminals of this resistor $R_1$. The capacitor $C_2$ and $C_{2-1}$ are charged at the rhythm of the periods of this voltage. If the intensity of the current in the charge is such that the $+ve$ and $-ve$ voltages are sufficiently high, the conduction threshold of the transistors $T_2$ and $T_3$ is reached, the $-ve$ and $+ve$ voltages being applied at their respective base through the resistors $R_{11}$ and $R_{12}$.

It can therefore be seen that the transistors $T_2$ and $T_3$ supervise increase in the current of the motor and prevent, beyond a certain intensity of this current, the charging of the capacitor C. Consequently, if a torque considered excessively high (the value of which is determined by the resistors of the protection circuit CP) is imposed on the shaft of the motor M, the supply of the latter is cut off by the closure of the triac T. However, as soon as the torque ceases to be applied, the motor automatically resumes the speed previously set by the potentiometer P. Note that the protection circuit also acts for limiting the starting current of the motor M.

For a more detailed description of the operation of the protection circuit just described, reference may be made to the patent application filed on even date in the name of the Applicant and entitled "Current limiting device for an a.c. motor".

It is clear from the foregoing description that the invention provides an electric speed variator which, at low speed, operates with a single half-cycle mode and with a high negative feedback through the circuit RE, which ensures the most stable operation for a high available effective power at low speeds of the motor.

This operation is all the more stable as the Zener diode Z imposing this single half-cycle operation also imposes linear conditions of operation on the capacitor C and the transistor $T_1$ in this speed range.

For higher speeds, operation with both half-cycles is automatically resumed, with no need for an additional contact, merely by displacing the slide of the potentiometer P. At the end of the travel of the slide, there is practically obtained a full-wave operation with both half-cycles.

According to a further feature of the invention, this variator comprises an intensity limiter (protection circuit CP) which also acts when starting up the motor. This protection circuit CP employs a large part of the elements of the variator and consequently results in a very low additional cost and also a corresponding very small additional consumption of space, this being especially true inasmuch as the elements of this protection circuit operate at low currents and powers.

Having now described my invention what I claim as new and desire to secure by Letters Patent is:

1. A speed variator for a single-phase a.c. motor comprising a triggerable silicon-controlled rectifier component having a control electrode and terminals for connection in series with said motor to an a.c. current source, a phase-shifting circuit having terminals and connected to the terminals of said rectifier component and comprising a capacitive branch and a resistive branch having a part and a regulating potentiometer having a slide and inserted in said part, said two branches having a junction connected to the control electrode of said rectifier component, a unidirectional semiconductor component responsive to voltage connected in parallel with said capacitive branch and said part of said resistive branch in which said potentiometer is inserted, said resistive branch comprising connected in parallel a first branch comprising a first resistor and said potentiometer interconnected at a junction point and a second branch comprising a second resistor and a third resistor, said second resistor and said third resistor having a point of junction connected to the slide of said potentiometer, said voltage responsive unidirectional component being connected to the point of junction between said potentiometer and said first resistor.

2. A speed variator as claimed in claim 1, wherein a diode is connected between said third resistor and said point of junction to which the slide of the potentiometer is connected.

3. A speed variator as claimed in claim 1, further comprising a circuit for measuring the current flowing in said motor, said measuring circuit comprising outputs for furnishing two output signals which are equal but of opposite sign and are functions of said current flowing in said motor, and an adjustable feedback circuit connected to be controlled by one of the output signals of the measuring circuit, said feedback circuit being connected to the terminals of said phase-shifting circuit.

4. A speed variator as claimed in claim 3, wherein the feedback circuit comprises a regulation transistor which comprises a base, an emitter and a collector and is connected in a common base configuration, the emitter of which transistor is connected to one of the outputs of said measuring circuit and the transistor having a collector-base path connected in parallel with said phase-shifting circuit.

5. A speed variator as claimed in claim 4, comprising two resistors connected in parallel with said unidirectional semiconductor component and having a point of junction to which point of junction the base of the regulation transistor is connected.

6. A speed variator as claimed in claim 3, further comprising an adjustable shunt circuit adapted to protect the motor from overloads, said shunt circuit being connected to the terminals of said phase-shifting circuit and connected to be controlled by the outputs of said measuring circuit.

7. A speed variator as claimed in claim 6, wherein said shunt circuit comprises two adjustable conduction paths, each of said conduction paths pertaining to a given half-cycle of the voltage furnished by said source and connected to be controlled by a voltage of one of the output signals of said measuring circuit which are respectively a function of the corresponding half-cycle of the current in said motor.

8. A speed variator as claimed in claim 7, wherein each of said conduction paths comprises a regulation transistor which is connected in a common emitter configuration.

* * * * *